Patented July 13, 1926.

1,592,306

UNITED STATES PATENT OFFICE.

WINFIELD SCHLEY LIENHARDT, OF STAPLETON, NEW YORK, ASSIGNOR TO METAL & THERMIT CORPORATION, OF CARTERET, NEW JERSEY, A CORPORATION OF NEW JERSEY.

PROCESS OF RECOVERING NICKEL.

No Drawing.   Application filed July 16, 1925.   Serial No. 44,117.

This invention relates to processes of recovering nickel; and it comprises a method of recovering nickel from acid solutions containing comparatively small amounts of nickel and comparatively large amounts of sulfuric acid, wherein the liquid to be treated receives an addition of a chlorid, which may be HCl or may be any soluble chlorid but is most advantageously sodium chlorid, and is thereafter contacted with extensive surfaces of a metal higher than nickle in the electromotive series, this metal usually being iron, although other metals, such as zinc, may be used whereby the nickel is precipitated as metal; all as more fully hereinafter set forth and as claimed.

In another and copending application, Serial No. 34,868, filed June 4, 1925, I have described and claimed a process of recovering nickel from acid liquors containing the metal in relatively small amounts, such as waste acid liquors from copper refineries, exhausted plating solutions, acid solutions used in leaching ores containing nickel, etc. These liquors are generally heavily acid with sulfuric acid. In this method, I flow or otherwise contact the acid liquor with extensive surfaces of a metal more positive than nickel, this metal usually being iron, such as scrap iron, borings, shavings, chips, etc. The iron goes into solution and the nickel is thrown down, generally in a sludge or mud form, as a loosely adhering deposit readily removable from the iron either by the flow of the solution itself or by a washing operation. Generally the operation is performed at a temperature of 60° C. or higher, for the sake of quickness of action and completeness of stripping. Usually the liquors are highly acid, the acidity sometimes being as high as 18–20 per cent $H_2SO_4$. Ordinarily, the iron is used in large excess of the amount required to react to completion with the acid present.

I have found that in this operation it conduces to an economy in iron going into solution and to a quickening of action if the liquid under treatment contains the chlorid ion, Cl'. This may be added in the form of hydrochloric acid, or, which is exactly the same thing, by adding a soluble chlorid. Common salt, NaCl, is a convenient chlorid to use. In contact with the liquor, it naturally reacts to give HCl and the Cl' ion. A wide variety of water soluble chlorid salts may be used. I may mention as examples: alkali chlorids, such as sodium chlorid and potassium chlorid; alkaline earth chlorids, such as calcium chlorid, magnesium chlorid, strontium chlorid, barium chlorid; metallic chlorids, such as iron chlorids, aluminum chlorids, manganese chlorids, zinc chlorid. These are mentioned simply as examples of water soluble chlorids which may be used in the performance of my process, but I do not confine myself to these but desire to cover the use of each and all water soluble chlorids. I may mention that there is a disadvantage in the use of chlorids of metals that come below iron in the electromotive series of metals, in that when such chlorids are used, such metals are precipitated wholly or in part and thus contaminate the precipitate of nickel. However, the most economical salt to use is sodium chlorid.

As explaining the results flowing from the use of my invention, I may cite the results shown in certain work with different chlorids. The particular liquor to be stripped of nickel was one containing 17.64 per cent $H_2SO_4$ and 2.5 per cent of nickel. To one lot of this liquor (A) an addition of 5 per cent of sodium chlorid was made; to another lot (B) 10 per cent of sodium chlorid was added, and to still another lot (C) 25 per cent of sodium chlorid was added. These three lots, together with a check lot of untreated liquor, which I may call (D), were contacted with metallic iron in large excess at a temperature of 95° C. The results are given in the following table:

| Lot | Grams sodium chlorid per 100 grs. solution | Grams nickle precipitated from 100 grams of solution | | Grams iron consumed per gram nickel precipitated in 30 minutes |
|---|---|---|---|---|
| | | In 15 minutes | In 30 minutes | |
| A | 5 | 1.34 | 1.80 | 5.1 |
| B | 10 | 1.85 | 2.12 | 4.7 |
| C | 25 | 2.05 | 2.42 | 4.1 |
| D | 0 | 0.84 | 1.09 | 8.4 |

It is apparent from the data in this table that the addition of sodium chlorid increased the rate of precipitation of nickel, increased the amount of nickel finally obtained at the end of the operation, and decreased the consumption of precipitating metal (in this case iron) per unit weight of nickel precipitated.

Similar results were obtained by the addition of equivalent amounts of hydrochloric acid and of other chlorids. The important thing is to secure HCl or Cl'; and sodium chlorid is merely a convenient means of securing the presence of the chlorid ion in solution.

What I claim is:

1. In the recovery of nickel from solutions containing the same and also containing sulfuric acid by the precipitation of the nickel as such by metals higher in the electromotive series, the process which comprises adding material giving the chlorid ion to such a solution prior to precipitation.

2. In the recovery of nickel from solutions containing the same and also containing sulfuric acid by the precipitation of the nickel as such by metals higher in the electromotive series, the process which comprises adding sodium chlorid to such a solution prior to precipitation.

3. In the recovery of nickel from solutions containing the same and also containing sulfuric acid by the use of iron, the process which comprises adding sodium chlorid to such a solution prior to precipitation.

In testimony whereof I affix my signature.

WINFIELD SCHLEY LIENHARDT.